United States Patent
Wyatt

(10) Patent No.: US 7,676,665 B2
(45) Date of Patent: *Mar. 9, 2010

(54) ARRANGEMENTS FOR INITIALIZATION-TIME AND RUN-TIME INTEGRATION OF FIRMWARE AND SOFTWARE EXTENSIONS FOR SUPPORTING ADD-IN HARDWARE

(75) Inventor: David A. Wyatt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 11/227,569

(22) Filed: Sep. 14, 2005

(65) Prior Publication Data

US 2006/0020936 A1 Jan. 26, 2006

Related U.S. Application Data

(63) Continuation of application No. 10/141,829, filed on May 10, 2002, now Pat. No. 7,007,159.

(51) Int. Cl.
*G06F 9/00* (2006.01)
*G06F 11/10* (2006.01)
*H03M 13/00* (2006.01)

(52) U.S. Cl. .............................. 713/1; 713/2; 713/100; 714/799; 714/807

(58) Field of Classification Search .................. 713/1, 713/2, 100, 191; 717/168, 169, 170, 172, 717/173; 714/799, 807
See application file for complete search history.

(56) References Cited

U.S. PATENT DOCUMENTS

| 5,291,585 | A  | * | 3/1994  | Sato et al. ..................... 710/10 |
| 5,504,905 | A  |   | 4/1996  | Cleary et al. |
| 5,596,738 | A  |   | 1/1997  | Pope |
| 5,857,022 | A  |   | 1/1999  | Sudia |
| 5,933,652 | A  | * | 8/1999  | Chen et al. ..................... 710/1 |
| 6,049,668 | A  |   | 4/2000  | Smith et al. |
| 6,094,063 | A  |   | 7/2000  | St. Pierre et al. |
| 6,266,809 | B1 |   | 7/2001  | Craig et al. |
| 6,446,199 | B1 |   | 9/2002  | Howe et al. |
| 6,631,520 | B1 |   | 10/2003 | Theron et al. |
| 6,760,785 | B1 | * | 7/2004  | Powderly et al. ............... 710/2 |
| 6,938,164 | B1 | * | 8/2005  | England et al. ............. 713/193 |
| 7,007,159 | B2 | * | 2/2006  | Wyatt ............................ 713/1 |
| 2002/0194313 | A1 | * | 12/2002 | Brannock ................... 709/220 |

OTHER PUBLICATIONS

Microsoft Computer Dictionary, 2002, Microsoft Press, 5th Ed., p. 97.*
more@power.globalnews.com, 8506 Writing FCODE Programs for PCI, Jul. 23, 1995.*
Deitel et al, C++ How to Program, 1998, Prentice Hall 2nd Ed., pp. 307-308.

* cited by examiner

*Primary Examiner*—Mark Connolly
(74) *Attorney, Agent, or Firm*—Trop, Pruner & Hu, P.C.

(57) ABSTRACT

Arrangements for initialization-time and run-time integration of firmware and driver software extensions for supporting add-in hardware.

23 Claims, 7 Drawing Sheets

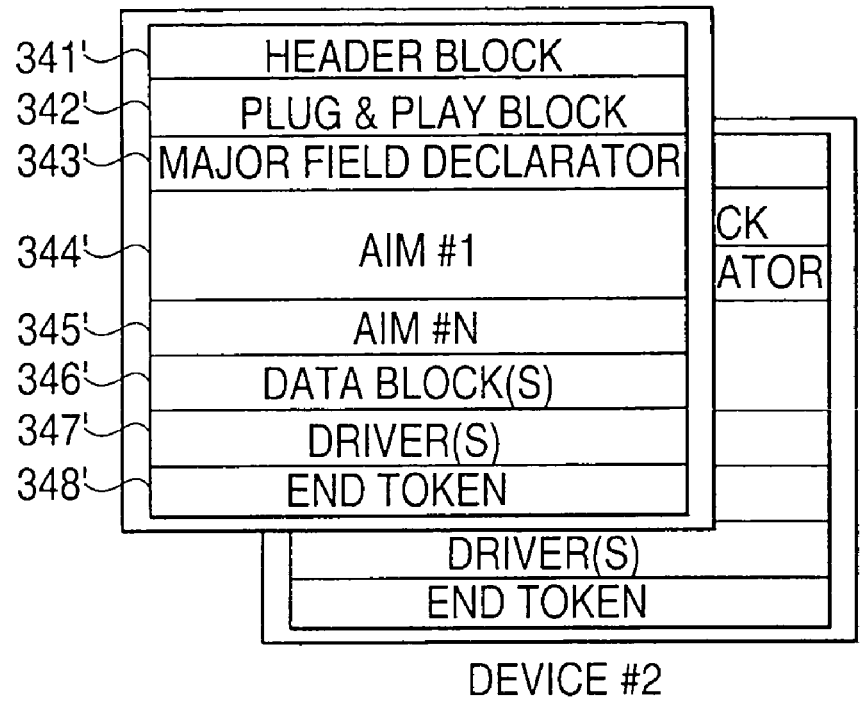
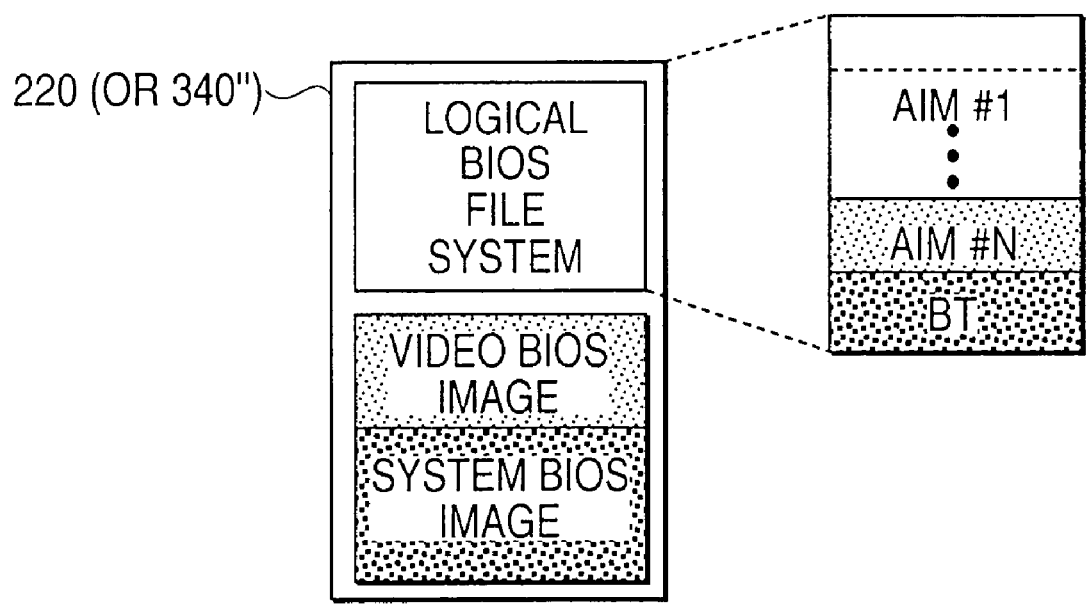

ARRANGEMENTS FOR INITIALIZATION-TIME AND RUN-TIME INTEGRATION OF FIRMWARE AND SOFTWARE EXTENSIONS FOR SUPPORTING ADD-IN HARDWARE

RELATED APPLICATION

This application is a continuation of U.S. patent application Ser. No. 10/141,829 filed May 10, 2002, now U.S. Pat. No. 7,007,159, issued on Feb. 28, 2006 entitled "ARRANGEMENTS FOR INITIALIZATION-TIME AND RUN-TIME INTEGRATION OF FIRMWARE AND SOFTWARE EXTENSIONS FOR SUPPORTING ADD-IN HARDWARE," the content of which is hereby incorporated by reference.

FIELD

The present invention is directed to arrangements for initialization-time and run-time integration of firmware and software extensions for supporting add-in hardware.

BACKGROUND

The computer industry's devotion, commitment and adherence to support long-existing as well as presently-known platform arrangements have advantageously helped fuel the wide-spread (i.e., global) acceptance of computers and the explosion of the computer industries. However, providing extensive platform support (e.g., within semiconductor integrated circuit (IC) chips) has likewise been found to result in disadvantages. Alternatively, if there is no extensibility to allow support for new technologies, it may seriously impact the products' potential lifespan and prematurely curtail its attractiveness. Integrated chipset products are unique in this context, in that they tend to have both a long life span and tight size limitations in order to remain within cost and complexity budgets.

With regard to wastefulness, as one example, a primary semiconductor area within a next generation chip (e.g., a graphics chipset) may be devoted solely to contemporary graphics functions, but a significant amount of additional semiconductor area also may provide additional support (e.g., circuitry) with respect to all viable legacy display devices (e.g., cathode ray tubes (CRTs), liquid crystal displays (LCDs), plasma displays, etc.) and display device interfaces (e.g. Analog Video Graphics Adapter (VGA) CRT signaling, analog Composite-Video Signaling (TV), Transition Minimized Differential Signaling (TMDS), Low-Voltage Differential Signaling (LVDS), etc.) known at "build-time." The problems are that the display support uses valuable semiconductor area, and adds to the design complexity, pin count, size, cost and time-to-marked (TtM) delays of the next-generation chip. Further, support for some of the displays already may be extraneous/unused in some environments (e.g., VGA CRT display support may be irrelevant or less important in notebook computer and personal digital assistant (PDA) environments using an integrated LCD), or may become extraneous in the future as new display technologies are developed and supercede old display technologies. For example, while CRT, TV and LCD displays are widely used/supported today, there are a number of differing standards applying at the interface cable from the host system to the display. For example, either the TMDS and/or LVDS interfaces may be used to control a digital LCD display.

Looking further into the future, it is already well understood that displays and display interface technologies are emerging. For example, while TMDS is quite popular for displays following the Digital Visual Interface (DVI) standard, there is a new mechanism layered on to this signaling to allow protection of content on the cable using cryptographic encryption and security protocols.

Additionally, it is understood that display technologies are still maturing, and while LCDs are increasingly popular today, new technology light-emitting plastic (LEP) displays and organic-electro-luminescent displays (OELD) are showing great promise, and may very well supercede these prior displays once LEP & OELD technology matures.

Since each of the display interface standards and display technologies has its own valid usage models, unique interface protocol, characteristics and limitations, the different display interfaces have typically been partitioned into display encoder devices which have a digital pixel interface on one side and encode this into the required display signaling interface that comes out the other side. This affords platform designers more flexibility in allowing the support of multiple display options, and the ability to source display technologies from different vendors.

However, the challenge for the software supporting the graphics controller and the display encoder interface is compounded because, not only are there different display standards, there are also a number of different vendors for each type of display interface, and each vendor has a number of different encoder products with different features, capabilities and different levels of integration (e.g., it is common practice to put support for multiple display interfaces into one encoder chip). In addition, even while the electrical standards for these devices may be somewhat similar, the programming interface to the encoder of the interface varies widely. In all cases, this involves significant algorithmic (software code) and parametric (software configuration data) differences in supporting each device. It is not feasible to re-purpose existing display initialization and configuration code and data to accommodate unforeseen interfaces and technologies.

Allowing platform extensibility to support such future display interface protocol and display technologies is an important aspect in extending the life of a graphics product, and thereby enhancing the return on investment from such a product's design.

Currently, the use of "daughter-cards" is one viable means by which to flexibly alter the display outputs supported and supply the display encoder needed, so as to extend display output capabilities of an original platform. However, presently, the types of daughter-cards supported by a platform is limited by the ability of software on the platform to identify the attached card, and requires that all the software and firmware support for that particular daughter-card be included in the platform firmware and software bundle prior to the introduction of the card, e.g., at build-time of the platform.

Additionally, because the boot Power-On Self-Test (POST) process, real-mode Disk Operating System (DOS) and other Operating System (O/S) environments require that firmware support be present in the video Basic Input/Output System (BIOS) from initial boot, this adds an additional problem. That is, video BIOS space is limited to a maximum of 64 KB in its final form, this being the maximum size of a real-mode x86 option read-only memory (ROM) segment. However, the video BIOS, as an option ROM, must allow some space for other real-mode option ROMs, so practically the limit is 48 KB, or even 32 KB. Further, there is limited space in which to include real-mode code modules necessary to support each of the possible display encoder options.

One solution to the excessive support problem is to provide limited predetermined support sufficient to enable boot-up, then perform reconfiguration while booted, and then re-boot to effect the reconfiguration. More particularly, a device or limited platform might be designed to support only a singular display configuration (e.g., an analog CRT), and then if it is later decided to reconfigure the platform to a differing display configuration, there is the ability to boot with the known working display (e.g., an analog CRT), then manually reprogram the non-volatile BIOS storage device with a ROM image including support to match an actual/desired display configuration (e.g., a Digital TMDS display), and then reboot. However, such reconfiguration is impractical to an original equipment manufacturer (OEM) if the platform has already shipped. Even if it has not shipped, this process adds disadvantageous configuration/customization overhead to the system assembly process.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein:

FIG. 10 is a simplistic block diagram illustration of an example arrangement of example file systems which may be contained in a serially-programmable device of a daughter-card; and FIG. 11 is a simplistic block diagram illustration of an example arrangement of an example modular BIOS file system, which may be contained in a firmware hub.

DETAILED DESCRIPTION

Figure 1:
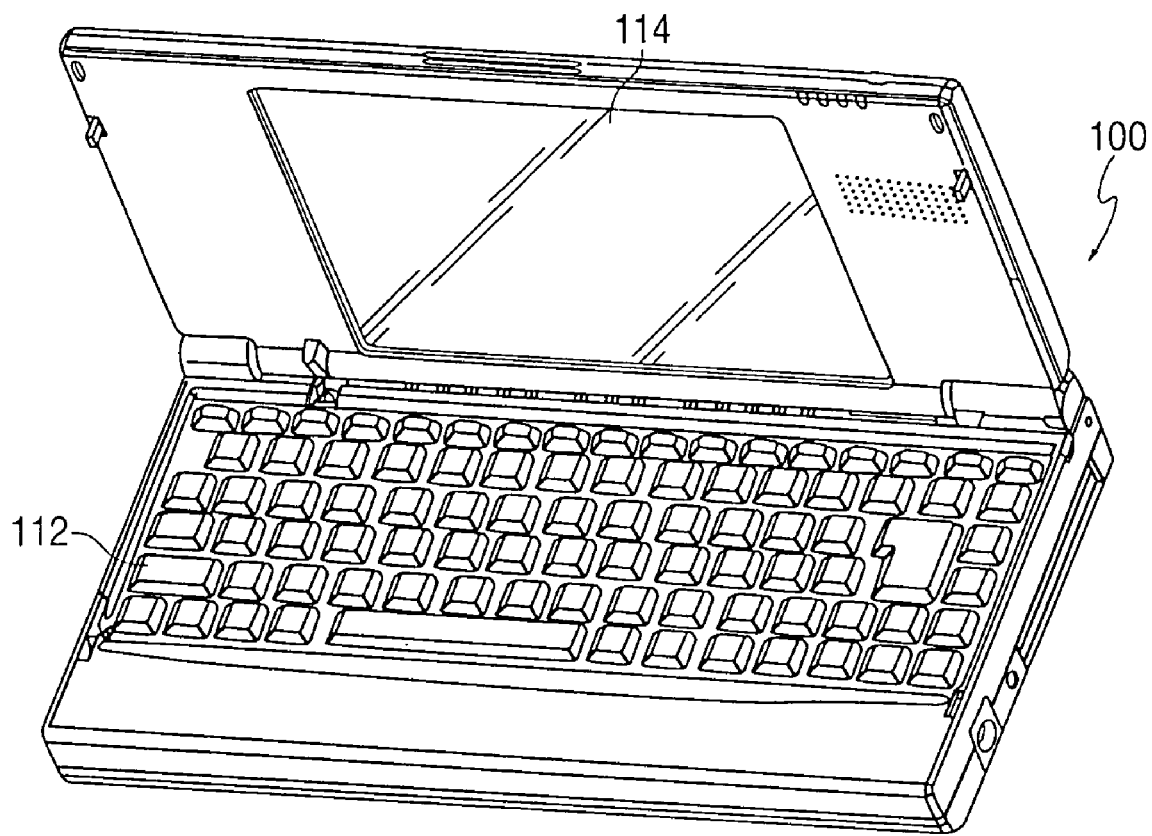
FIG. 1 is a perspective view of an example notebook computer, such view being helpful in gaining a more thorough understanding/appreciation of the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Still further, the clock and timing signal FIGS. are not drawn to scale, and instead, exemplary and critical time values are mentioned when and if appropriate. Well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

The following U.S. patent references may have relevance to the present application:

Ser. No. 09/223,808 filed Dec. 31, 1998 to Andrew J. FISH and Yan LI; and

U.S. Pat. No. 6,381,693 issued May 16, 2002 to Andrew J. FISH and William J. CLEM.

Although example embodiments of the present invention will be described using the example environment of an example motherboard/daughter-card block diagram in an example notebook personal computer (PC), and with add-in coder-decoder (CODEC) devices to provide customized platform support for a particular display, practice of the invention is not limited thereto, i.e., the invention may be able to be practiced with other types of environments, platforms, etc. (e.g., PDAs, game consoles, desktops, servers, etc.), and with other types of hardware devices (e.g., network cards, modems, etc.).

FIG. 1 is a perspective view of an example notebook computer, such view being helpful in gaining a more thorough understanding/appreciation of the present invention. More particularly, FIG. 1 illustrates a portable computer product 100 (e.g., produced by an OEM), such computer 100 having a keyboard 112 and a display screen 114. The portable computer 100 may be constructed to contain a high level processor, for example, a Pentium-family processor manufactured by Intel Corporation of Santa Clara, Calif. Memory storage space is provided within the computer 100 (e.g., via floppy disk, hard disk, compact disc (CD) ROM, and digital versatile disc (DVD) ROM). Further, in the present example, it will be assumed that the OEM intends to construct computer 100 with a futuristic display interface and/or display device which may not be supported by motherboard platform integrated components (e.g., a graphics memory controller chipset (GMCH)) at computer 100 build-time.

Figure 2:
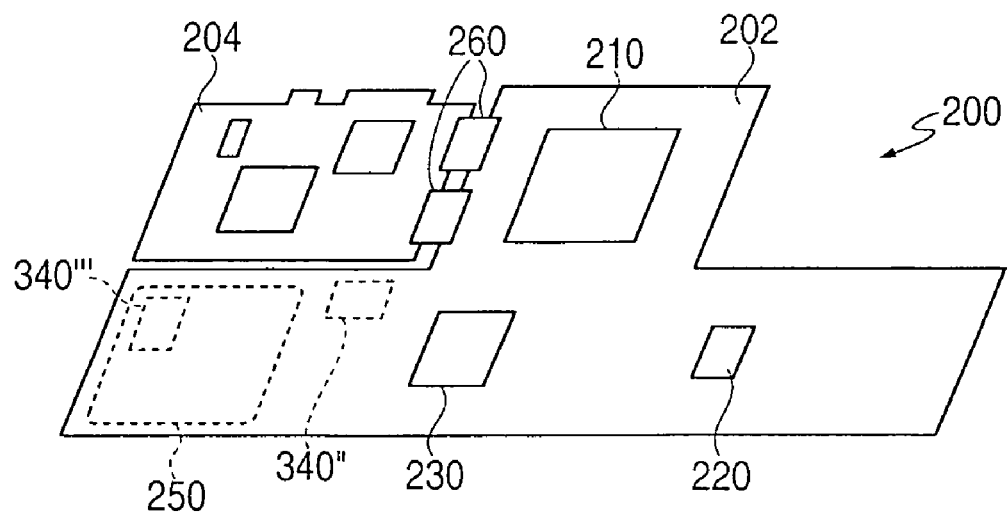
FIG. 2 is a simplistic perspective view in schematic form of an example motherboard/daughter-card of the FIG. 1 notebook computer, such view also being helpful in gaining a more thorough understanding/appreciation of the present invention.

Continuing relevant example discussions, FIG. 2 is a simplistic perspective view in schematic form of an example motherboard and daughter-card of the FIG. 1 notebook computer, such view also being helpful in gaining a more thorough understanding/appreciation of the present invention. More particularly, FIG. 2 illustrates a view of an example motherboard/daughter-card arrangement 200 (e.g., supplied by a platform manufacturer) which can be used within the computer 100. The arrangement 200 may include a motherboard 202 (e.g., manufactured/supplied by a motherboard manufacturer), and a daughter-card 204 (e.g., manufactured/supplied by a daughter-card manufacturer, or a hardware (e.g., display) manufacturer such as a display interface encoder manufacturer or display device manufacturer).

Example components 210, 220, 230, 250 and 260 are used to represent example motherboard 202 components. More particularly, the motherboard component 210 may, for example, be the aforementioned high-level processor such as a Pentium-family processor manufactured by Intel Corporation of Santa Clara, Calif. The component 220 may be, for example, a non-volatile ROM, and the component 230 may be, for example, a graphics memory controller hub (GMCH), component 250 may be a non-volatile storage, for example, flash memory, a hard disk drive (HDD), and components 260 may be, for example, inter-board connectors such as add-in adapter card slots. In one non-limiting example embodiment, the connectors 260 may be advanced graphics port (AGP) connectors. Numerous other components and wiring traces are not illustrated within the FIG. 2 motherboard 202, as such items are well known in the art and are thus omitted from this disclosure for sake of clarity/brevity. Other items 340", 340''' (shown in phantom dashed-line form) are discussed further ahead.

In a disadvantageous background approach, a significant amount of semiconductor area of the GMCH 230 may have been required to provide comprehensive support with respect to all viable legacy (e.g., CRT) and other optional displays (e.g., LCDs, plasma displays, LEPs, etc.) known at build-time. However, such was disadvantageous in terms of extreme complexity, wasted semiconductor real estate, increased die and platform size, increased product costs, TtM delays, all with no guarantee that a majority (or even any) of the support would be subsequently used upon chip implementation. As mentioned previously, in the present example embodiment (used to describe the invention), the GMCH does not (at build-time) provide support for display 114. In fact, a GMCH 230, in accordance with the present invention, may output only one or a limited number of predetermined generic output signals (e.g., digital) and may include no, or only minimal, support with respect to possible displays.

More particularly, the GMCH 230 may be designed/manufactured to output only predetermined generic (e.g., digital) output signals/information, as opposed to having the capability for differing outputs (e.g., analog CRT signals, LCD signals, etc.). Instead, with the present invention, the daughter-card 204 may be delegated with, and assume the responsibility for, receiving and converting the generic signals/information into differing signals/information appropriate to an ultimately-implemented display (e.g., TMDS over a DVI to a LCD display). That is, the daughter-card 204 may be used as an intermediary to flexibly augment the generic motherboard's display outputs, and supply any display encoder needed to support the implemented display. Accordingly, a GMCH 230 having lesser support hardware/software functions may be manufactured in accordance with the present invention at decreased complexities, costs, size and lesser TtM delays.

In the event that the original platform provides no support with respect to displays, it is noted that there will be no visual support (i.e., display image, cursor, etc.) at the hardware installation time which can be used on the platform by a hardware installer to help install software support (firmware, drivers, etc.) for subsequent add-in hardware. Advantageously, embodiments of the present invention allow the support to be incorporated into the platform after the original platform firmware/software has been assembled, and on-the-fly (dynamically) during initialization time (and run time) of the platform. Such can be done even without initial usual support, or even a hardware installer's intervention. More particularly, support can be incorporated automatically upon each and every initialization operation of the system, and without user intervention. Such will become more apparent after a complete reading and understanding of the disclosure. It is noted that such allows easy customization as well as just-in-time manufacturing of the notebook 100 system.

Turning to another disadvantageous background approach, firmware implemented during initialization disadvantageously has an image completely pre-formed prior to a start of initialization, with such pre-formed image being applied/used in toto without change during initialization. More particularly, for understanding, attention is directed to FIG. 3, which is a combination time chart and block diagram view 300 helpful in gaining a more thorough understanding/appreciation of background as well as the present invention. Within the time chart, a predetermined time, e.g., t=0, defines a boundary between initialization processes INIT and boot processes boot (and beyond). That is, in the FIG. 3 example, areas to the left of t=0 represent times of INIT processes, and areas to the right represent times of boot processes. Areas to the right of t=0 (i.e., later in time or subsequent to) may be called "run-time," where "run-time processes" are conducted, where the boot processes themselves are a subset of run-time processes.

At this point, it is useful to point out that there is a world of difference as to how INIT procedures/firmware have been treated in the industry, in comparison to post-INIT procedures and firmware (e.g., boot programs, operating systems, etc.). In order to understand a substantial significance of this, one needs to understand the following.

More particularly, firmware (including BIOS) has historically been embodied as an assembly language (i.e., machine code) program which is first loaded (before the O/S) when a computer is started, and which provides the most basic, low-level, intimate control and supervision operations for the computer. More specifically, firmware performs functions such as POST, etc. As firmware has historically been embodied in assembly language, it is disadvantageously very difficult to write, debug and/or change. Any change in a firmware image typically had effects upon other areas of the firmware, often negative effects. Further, long standing specifications have required firmware to be crammed into specific memory areas. Cramming into specific memory areas has resulted in firmware being embodied as a singular or small number of monolithic blocks of assembly language code having intertwined code supporting numerous operations/functions, such monolithic blocks each incorporating a large number of objects/functions and thus being disadvantageously difficult to write, debug and/or change.

PC-compatible firmware is typically based upon assembly language, using machine-code level programming techniques. As such, firmware development is very detail-oriented, with few programmers and/or companies capable of making large changes. Once a firmware module is completed development and validation, the image is "burned" into a fixed size ROM device or otherwise permanently programmed into non-volatile storage, for example, such as in flash devices, HDD devices, over network devices on the platform, or in an add-in adapter card. Once programmed, it is not referenced until boot-time loading, and typically cannot be adjusted, augmented or otherwise modified without replacing, re-flashing, and re-booting. It is therefore in the best interest of platform vendors and integrators to keep the development effort to a minimum using techniques such as componentization and modularization—and especially to off-load the development and support of specialized platform add-in hardware options to the Independent Hardware Vendor (IHV). This model may be used in O/S driver and post-INIT environments, where software can be readily updated though multiple user-accessible inputs (such as floppy disk, internet, HDD, etc.) in a flexible storage environment to facilitate customization of components in the platform. However, such has not been applicable to the firmware environment due to the rigid nature of firmware programming, size and loading, and this has not been applied to component support within the video BIOS or other platform firmware.

Continuing the discussion, further initialization particulars are of interest to the present discussion. More particularly, since ROM 220 devices typically have access times much slower than access times optimal for the processor 210, the firmware image (pre-existing within the ROM 220) may be "shadowed," i.e., copied without change, during the initialization process, into storage memory devices having faster access times, i.e., copied into an active shadow random access memory (RAM) area (not shown). That is, during a normal boot POST phase, a region of shadow memory into which the base and video BIOS will be loaded is reserved. The image is copied from any non-volatile storage device in which the base and video BIOS are stored into the active read/write shadow RAM which will actively be used to provide the real-time (implemented) firmware of the system.

After it is copied into the shadow region and the POST operations resume, the shadow region is changed from read/write to read-only. In either case, the system BIOS and O/S execute BIOS code from the faster shadow RAM region, rather than the slower, non-volatile device. Again, such shadow RAM area may exist internally within the processor 210 chip, or alternatively, may be provided separately from the processor 210 chip (e.g., via separate dynamic-RAM (DRAM) chips, flash memory, part of the HHD 250, etc.). Typically, an excessive shadow RAM region greater than an expected firmware size is reserved, with any unused shadow RAM region simply becoming an unused padded area (e.g., padded with a constant value such as all zeros or all ones).

To further particularize the above firmware copying, the shadow RAM area is operated only briefly in a readable/writable fashion (such brief period shown representatively in FIG. 3 as the short R/W shadow RAM range) during the initialization process, and is generally (except for other legal R/W shadow RAM write times, such as power management (e.g., sleep/resume) operations mentioned ahead) operated in a read-only fashion thereafter (i.e., to lock out further writing), with the shadow RAM being operated as the active firmware memory device (having the actually-implemented firmware) thereafter. In the aforementioned disadvantageous approach, only the ROM 220 contents are copied (shown representatively by the FIG. 3 arrow 310) onto the shadow RAM without change.

Thus, with this static disadvantageous approach, firmware for all hardware (e.g., including an implemented display) must be pre-included and ready for copying within the platform firmware bundle, i.e., ROM 220, prior to initialization. Thus, with the static approach, any firmware reconfiguration (e.g., to support added hardware) requires boot-up, then reconfiguration and reprogramming (including flashing non-volatile devices) while booted, and then an additional re-boot to allow the new firmware reconfiguration to take effect. Such is disadvantages in terms of boot/reboot and intervention time/trouble imposed on an OEM and/or ultimate end-user.

In contrast, one embodiment of the invention leverages off of the fact that the shadow RAM area is operated briefly in a readable/writable fashion during initialization, in order to accomplish "dynamic" firmware customization during the initialization process. That is, this invention leverages off the normal initialization process, and focuses on the time in which the shadow RAM region is read/write during the video BIOS POST phase prior to O/S INIT phase or prior to resuming O/S operation (as discussed ahead), to dynamically augment or change the normal (or base) firmware image. The normal (or base) firmware image may be thought of as a firmware image which was provided with an original platform of the system. In contrast, an extended firmware image may be thought of as the base firmware image integrated with at least one firmware extension (i.e., the base firmware has been augmented with additional firmware, e.g., appended onto, for example, the beginning, middle and/or end thereof).

As one example, during an initialization interval, as many display encoder firmware modules as are required may be copied into video option ROM shadow region and the video BIOS size thus appropriately appended. This allows the video BIOS to grow or shrink as much as necessary at INITINI run-time to incorporate the necessary device support. That is, stated generally, embodiments of the present invention further include customization firmware/software (F/S) 340 (FIG. 3), including firmware extensions, and further include mechanisms (example(s) discussed ahead) to further effect copying (shown representatively by the FIG. 3 arrow 320) of at least portions of the custom F/S 340 into the shadow RAM during the R/W shadow RAM range. With appropriate mechanisms (example discussed ahead), copying can be effectively made invisibly and/or automatically without any need for OEM or user intervention, or any need for a presently-operating display.

Accordingly, at initialization lock time (which is the point where the shadow RAM area is thereafter generally locked in a read-only fashion to prevent further writing), the shadow RAM in accordance with the present invention may contain a copied combination of the ROM 220 firmware and custom F/S 340 firmware extensions, and such copied combination may be used thereafter as the implemented firmware of the system. As will be understood from further reading of the disclosure, the custom F/S 340 device may be provided as many different forms and at many different locations within a system, and may even exist outside the system (e.g., on an external accessible network).

Figure 4:
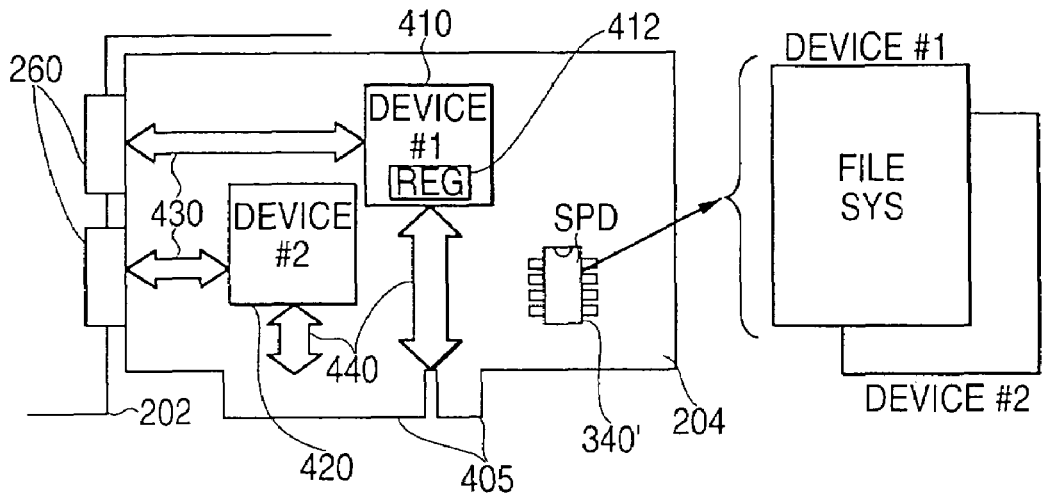
FIG. 4 is an enlarged plan view in schematic and block diagram form of an example FIG. 2 daughter-card, such view also being helpful in gaining a more thorough understanding/appreciation of the present invention.

Discussion turns next to an example embodiment which includes an example location/component for implementing the custom F/S 340 firmware. More particularly, FIG. 4 is an enlarged plan view in schematic and block diagram form of an example FIG. 2 daughter-card, such view also being helpful in gaining a more thorough understanding/appreciation of the present invention. Again (just as with the prior motherboard discussions), numerous other components and wiring traces are not illustrated within the FIG. 4 daughter-card 204 for the sake of brevity (as such items are well known in the art).

The card 204 interfaces with the motherboard 202 via the connectors 260, and further may have device connectors 405 for interfacing to additional hardware, e.g., a display such as FIG. 1's LCD 114. Further included, for example, is one or a plurality of devices 410, 420 for providing intermediary services/functions (i.e., support) between motherboard components (e.g., the GMCH 230) and the additional hardware. In the present display example, the devices 410, 420 may be, for example, display encoder devices for converting predetermined generic (e.g., digital pixel) display output signals/information into differing signals/information (e.g., analog CRT, TMDS, LVDS, etc.) appropriate to an ultimately implemented display (e.g., a LCD display). Thus, the devices 410, 420 interact (as indicated representatively by the arrows 430) with the motherboard components, and also interact (as indicated representatively by the arrows 440) with the additional hardware (LCD display 114). As one interaction example, a device 410, for example, may have a register 412 which may be able to be loaded (set) with device operating parameters (e.g., timing speed, etc.) by a processor of the system using, for example, an Inter-Integrated Circuit (I²C) bus (The I²C Bus Specification, version 2.1, January 2000, The Phillips Corporation).

Further included on the card 204 is custom F/S device 340' in a form of a serially-programmable device (SPD). As shown in representative block diagram form on the right-hand side of FIG. 4, the SPD 340' may contain a file system for each of the devices 410, 420. FIG. 10 is a simplistic block diagram illustration of an example arrangement of example file systems which may be contained in such a SPD 340' device. As illustrated in the FIG. 10 example, the file system may include a header block 341', plug-n-play configuration 342', major field declarator 343', one or more add-in module (AIM) firmware 344', 345, data block(s) 346', driver(s) 347', and an end token 348', although practice of the present invention is not limited to such specific items or combination of items.

Regarding the header 341', such may be any predetermined header (i.e., having a predetermined format and content). Next, with the plug-and-play items 342', any number/combinations of different items may be included and may be listed in a table of contents (TOC) or index, for example, a non-exhaustive listing including: a daughter-card identifier, device identifier(s), an indication that a firmware extension image is available (in the custom F/S device), a reference (e.g., start) address of the firmware, an indication that AIM firmware, data block(s) and driver(s) or other software is available, and a reference address of each of the same. Alternatively, the major field declarator 343' may include the TOC or index, or the reference address of each AIM firmware, data block(s) and driver(s) sections. As to the firmware items 344', 345', such firmware is customization firmware or firmware extensions as previously discussed, and is available/useable to customize system firmware with respect to the card 204 and/or devices 410, 420. Data block(s) 346' may contain data (e.g., tables, settings, parameters, etc) with respect to the AIM firmware. As to the driver items 347', driver(s) or other software support may also be needed for the card 204 and/or devices 410, 420 in addition to the firmware support. Finally, the end token 348' may be any predetermined footer (i.e., having a predetermined format and content)

With regard to such driver support, in returning momentarily to the FIG. 3 time chart, such customization driver(s) 347' may also (in addition to the customization firmware) be loaded into the system at any time, with FIG. 3 showing an example (indicated representatively by the arrow 350) where the driver(s) are loaded at a time after initialization. More particularly, the driver support may be automatically loaded shortly after t=0 (e.g., during boot-time) upon every boot, or alternatively, may be loaded at a time much later than t=0 (i.e., during run-time) and only if/when it is positively determined by the system that the driver support is needed.

At this point, it is noted for understanding that custom F/S 340 device is not limited to being provided on the daughter-card. More particularly, directing attention back to FIG. 2, some non-exhaustive alternative embodiments are shown in dashed-line form. That is, a first example illustrates a custom F/S 340'' device (or area) provided on the motherboard 202 (e.g., an SPD IC plugged into a provided motherboard socket), and a second example illustrates a custom F/S 340''' device provided as a protected (e.g., locked, read-only) area of HDD 250.

More particularly, FIG. 11 is a simplistic block diagram illustration of an example arrangement of an example modular BIOS file system, which may be contained in a firmware hub. In addition to base firmware (including a system BIOS image and video BIOS image), there may be a logical BIOS file system. The logical BIOS file system may include one or more AIM firmware sections, and may further include a BIOS table (BT) or other major field declarator defining, for example, a TOC. A modular BIOS interface (MBI) mechanism (e.g., in the form of interface firmware) may be included within the system (e.g., within the base firmware) for facilitating access to the logical BIOS file system. The example FIG. 11 logical BIOS file system may include further items, for example, ones of the items discussed previously with respect to FIG. 10.

Continuing with further discussions, an embodiment is even envisioned where custom F/S may be located on and retrieved from a network (e.g., intranet, internet) connected to the system 100. Whether the custom F/S 340 support is provided on a daughter-card, on the motherboard, or elsewhere in the system or on an external network, the initialization system of the platform can be arranged (e.g., programmed) to look for the custom F/S 340 at one or more predetermined addresses, at one or more predetermined locations, or via an index within the system upon initialization. Further, an embodiment is envisioned where the custom F/S 340 has a predetermined identifier for identifying the same, e.g., a predetermined series of bits or bytes at a beginning thereof.

At this point, it is further useful to note that the custom F/S is not limited to being provided/copied from one singular device and/or location, i.e., it may be provided/copied from any number or combination of devices/locations. For example, a portion of custom F/S may be copied from the daughter-card's SPD 340' (FIG. 4), another portion from the motherboard's firmware storage device 340'' (FIG. 2), another portion from off-line storage 340''' (FIG. 2), and another portion from network connection. See the FIG. 8 example described ahead for an example elaboration.

It should be apparent at this point that, with the present invention, F/S customization can be accomplished invisibly and automatically even after platform components (e.g., a motherboard) have been shipped to a user. That is, custom F/S 340 can be tacked (e.g., inclusion on the daughter-card) into the platform with addition of hardware, and the INIT and boot processes can be designed to automatically look for and automatically/invisibly load (e.g., without user intervention or use of a display) at least portions of any tacked-in custom F/S 340 during each INIT process. The firmware module can be loaded either from the card itself, or from the platform or an external network, ensuring that any card (or hardware in general) will be instantly supported from the first time it is first installed in the platform, and without requiring manual reprogramming of the non-volatile BIOS storage unit, nor requiring reprogramming with another display device and rebooting.

Discussion turns next to a summary of example hardware aspects of example embodiments of the present invention. More particularly, as one example embodiment, the invention may consist of:

a graphics controller such as used in stand-alone add-in adapter card, or such as integrated within a system chipset GMCH 230 supporting one, or more digital video output (DVO) ports; such GMCH may have the following associated therewith:
  GMCH/motherboard high-speed digital interface to an add-in card slot (advanced graphics port (AGP) or connectors 260 in this example);
  a software-readable register (I/O, MMIO, PCI Config Space or other) such as 342' (FIG. 10) by which the signal identifier signals may be read back for the purposes of hardware self-configuration and software plug-and-play enumeration;
software for the GMCH, including;
  system BIOS firmware (220) on the platform for DOS, ACPI, O/S support;
  video BIOS firmware for DOS, "Legacy" VGA and VESA extensions support;
  O/S native software drivers;
add-in hardware, such as an AGP Digital Display (ADD) add-in card 204 with compatible high-speed digital interface;
  hard-wired (strapped) or switch/jumper selectable identifier signals on the card (ADD_ID);
  internal and/or external display interface and connectors 405 to display devices (monitors); and
  either and/or both of;
    ? add-in software module 344', 345', 346' on the ADD card inside a serial programmable memory device (SPD) 340' attached to I²C interface at fixed address/offset location on the ADD Card;
      in this case, the image is read from the SPD using I²C interface on the card (e.g., see right-hand portion of FIG. 7);
    add-in software module on the platform, in the system firmware;
      in this case, the image is read through system BIOS interfaces (e.g., see center portion of FIG. 7).

As previously mentioned, this invention initializes so as to incorporate the support embedded on the daughter-card, or contained in the platform firmware, or external network, or other storage medium. Assuming the support comes from the non-volatile storage embedded in the daughter-card, then all the firmware/software necessary to support a card can travel with the card. Integrating the support together with the card offers additional advantages because:

it is impossible to predict years in advance what display or other hardware will appear, and have the software ready for each option by the time the product reaches production (being assembled at build-time), or enhancement option as may become available sometime after production;

it is an obvious improvement if one can allow support for future hardware in such a way that no change is required in the existing platform in order to install that unknown hardware option;

even if possible, it adds unreasonable cost, additional development and validation burden to integrate hardware that may or may not be present into every platform's software delivery process;

it is an improvement if the development, validation and integration burden can be moved to the third party hardware developer;

it may not be desirable to allow platform software to become intrinsically "tied" to any particular third party hardware and software configuration, and picking a single source or selection of sources may be problematic. For example, if integrated into the rest of the platform, then lack of availability of the component from the third party supplier, or defects in the third party hardware or software may require re-tooling of the platform and software and/or other remedial actions;

by disconnecting the implicit linkage between the hardware option, from the platform, in terms of firmware and software requirements, the platform becomes more open to innovation and more flexible to extension and customization with potential cost and manufacturing savings.

It should be apparent at this juncture of the disclosure that the example embodiment covers at least two major areas, i.e., BIOS firmware enhancement and native driver enhancements. Either or both of these may be incorporated from components loaded from the add-in hardware. BIOS support may leverage off a run-time linking method, while the native driver module may use run-time loading.

Figure 5:
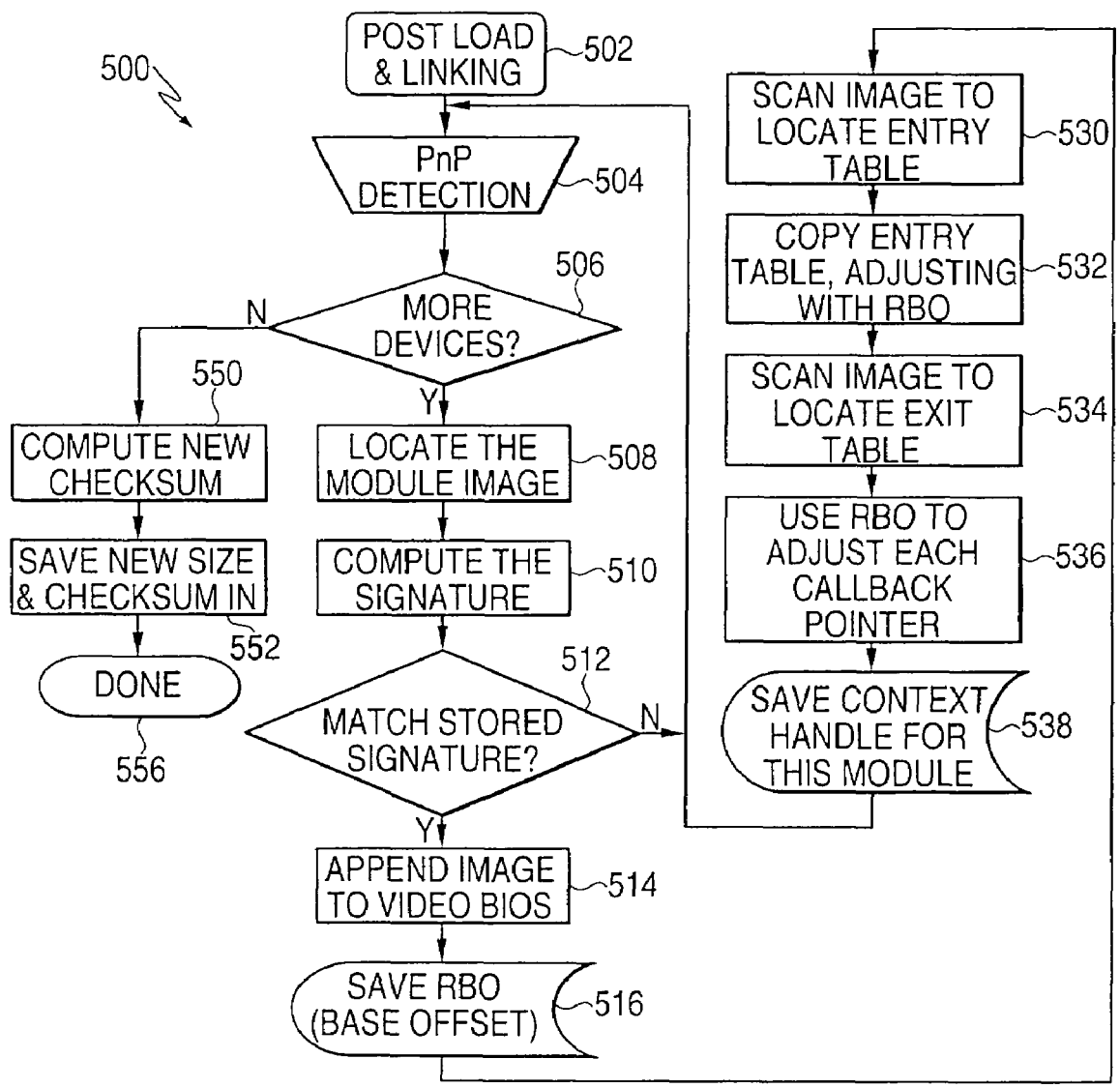
FIG. 5 is an example flow chart of an example firmware initialization-time linking process applicable to the FIGS. 1-4 arrangements, such chart being helpful in gaining a more thorough understanding/appreciation of the present invention.

Discussion continues with more example discussions of each enhancement, starting first with BIOS firmware enhancement, and drawing attention to the example flow 500 of FIG. 5 when appropriate. More particularly, FIG. 5 is an example flow chart of an example firmware initialization-time linking process applicable to the FIGS. 1-4 arrangements, such chart being helpful in gaining a more thorough understanding and appreciation of the present invention.

The FIG. 5 flow can be discussed as follows:
  BIOS module enumeration during system POST (FIG. 5);
    while still in POST phase (i.e., in the FIG. 3 INIT processes time), the shadow RAM is read/write while the system BIOS loads option ROMs into shadow RAM and initializes them (FIG. 5, 502);
    during initialization, the video BIOS will detect and enumerate the presence of display option hardware, and locate the necessary firmware add-in module for supporting that display hardware (504, 506, 508).
  Again, the support may be stored on the add-in card, or stored elsewhere on the platform, or made available from an external network;
  regarding security in loading the module, loading may be effected with or without security analysis of the module;
    one example security analysis is as follows:
      a signature value of the validated add-in module image may be computed by performing a cryptographic algorithm (a non-exhaustive example listing being such as SHA-1, MD5, Cyclic Redundancy Check, (CRC) or other checksum, etc.) using digital signature techniques such as performing a one-way hash function over the image, including a "secret" value or private key (510), to produce a "signature value";
      the specific algorithm and secret value may be known only by the trusted entity such as the original component vendor (for example Intel Corporation), or a platform manufacturer, and for example, may be hidden inside the video BIOS algorithm, given that the base video BIOS is typically provided by the original component vendor;

the verification process is performed at run-time by a trusted entity, for example the video BIOS supplied by the original component vendor, generating a signature using the same algorithm, over the image, using the equivalent secret or public key;

if the result computed at run-time matches the stored signature value, it can be assumed that the signature value retrieved from the image was authentic, and that the signature was produced by a trusted entity over a validated image (thereby verifying the "origin" of the image), and that the image has not been altered since validation had been performed (thereby verifying "integrity" of the image);

the resulting signature is compared (512) to the (public) signature attached to the image (read from the SPD) coming from non-volatile storage;

if the signatures match ("Y" branch of 512), the BIOS can be reasonably certain the image is okay, integrity is okay in that the image is verified to be copied into shadow RAM ("Y" branch of 512); if non-matching ("N" branch of 512), the image is not verified and thus is not copied, and flow feeds back to return to block 504, to check for other devices;

if matching ("Y" branch; 512), the image is loaded into the shadow RAM, appended after the existing shadow RAM copy of the video BIOS (514);

the start location, also known as the relocation base offset (RBO), is saved (516), as such is the address where the add-in module has been placed, and is important in the fix-up linking process.

Further background and other discussions are appropriate at this point. More particularly, in one disadvantageous approach, when integrating modules into an executable image in the development of the firmware image, a linker is required to take in the object file produced by a compiler and patch all the offsets of any relocatable addresses within the module. This applies to public entry and exit calls as well as any intra-module references that are initially compiled as relative offsets. Linking has been an important step in the disadvantageous approach in integrating additional module support (compiled object code) into the BIOS.

In contrast, example embodiments of the present invention allow the direct use of object code, bypassing the normal linking steps. This frees up any developer of the video BIOS and the display option module, and adds considerable flexibility. That is, the video BIOS does not need to provide images, or linking tools to the developer of display option modules, or OEM's choosing from a selection of add-in hardware options.

There are also many risks in allowing such flexibility at the hands of developer or integrator, in that the add-in component firmware and software runs as part of the base firmware and software, and is associated with the original component supplier, for example Intel Corporation. Any compatibility or robustness problems caused by the add-in hardware or software may, by association, be perceived as problems of the base hardware and software and of the original component (e.g., platform, chipset, etc.) supplier (e.g., Intel Corporation). The signature process allows the origin and integrity of the add-in module image to be verified before the firmware support is executed or the add-in hardware supported. The algorithm and secret or key used in generating the signature is restricted to trusted entities with the implicit agreement that only add-in modules which have been inspected, approved, and/or otherwise validated on the given platform will receive a valid signature. The run-time checking of the image and the signature is performed by algorithms obfuscated within base firmware and software supplied by the trusted entity. In order to allow third party developers to create, prototype and deliver the add-in firmware for testing by platform integrators, special versions of the base video BIOS may be supplied which selectively check the signature or are clearly labeled as a debugging version and not licensed for production redistribution.

Additionally, the developer can ship the object code produced by the source compiler and it can be integrated on any version of the video BIOS image. This will become more apparent in the further discussion of the FIG. 5 flow in attaching the module, as follows:

after block 516, the video BIOS scans the image for a desired public interface table preceded by a predetermined entry-point marker (530);

this marker may, for example, be delineated by a unique binary sequence (e.g., '$ADDIN30');

if the interface is not present, the arrangement may choose lower revision level interfaces or other known delineating unique binary sequences, repeating the scan as necessary;

the entry-points listed within an AIM entry table may be a list of offsets relative to the base RBO (e.g., reference address) of the add-in module;

the video BIOS then reads in the entry-points fixup BIOS→AIM entry points in the module;

the video BIOS will internally copy the pointer table and fixes up the pointers by adding or adjusting with the relocation base offset (RBO) (532).

An example AIM entry point table adjustment may be as follows:

TABLE 1

Example Entry-Point (Call-In) Table Structure

| | |
|---|---|
| AIMCallTable struct | |
| AIMCTHeader | DB '$ADDIN30' ; Entry-Point (Callin table) Marker |
| InitializeDevice | DW OFFSET MyInitializeDevice |
| GetParameters | DW OFFSET MyGetParameters |
| GetStatus | DW OFFSET MyGetStatus |
| IsModeSupported | DW OFFSET MyIsModeSupported |
| SetDeviceTimings | DW OFFSET MySetDeviceTimings |
| SetDevicePowerState | DW OFFSET MySetDevicePowerState |
| SaveDeviceState | DW OFFSET MySaveDeviceState |
| RestoreDeviceState | DW OFFSET MyRestoreDeviceState |
| SetHotPlug | DW OFFSET MySetHotPlug |
| SetCopyProtection | DW OFFSET MySetCopyProtection |
| AIMCallTable ends | |

Table 1 is a structure containing example relative offset pointers to function within an example relocatable add-in module. The function table represents example hardware routines that the video BIOS may need in order to abstract managing the hardware-specific operation of the add-in module, e.g., finding if a particular display mode is supported (IsModeSupported), or setting the display mode by programming the encoder chip (SetDeviceTimings).

Each of the pointer names on the left is a pre-determined offset within the structure for a pre-defined subroutine within the module. When the module is compiled by the developer, each of the address offsets on the right of this table may be filled in by the compiler with the relative offsets containing the address, from the beginning of the relocatable add-in module object code, to the actual routine. This Table will be read by the video BIOS after loading, and the relative offsets will be adjusted by adding the relocation base offset, to form the actual absolute address.

When a call to any of these entry points is made, the video BIOS may pass a context handle, which may, for example, include the RBO such as in a form of:

InitializeDevice(ContextHandle, Parameters)

In continuing further discussion of the FIG. 5 flow:
if a module interface was found, then the video BIOS may perform the following additional steps after block 532:
  located directly after the previous entry-point table may be an exit-point table which may, for example, contain the address pointers of any add-in module→video BIOS callbacks (534);
    this table may contain addresses of routines within the core video BIOS that provide hardware and platform specific run-time services for the add-in module;
    the video BIOS may fill in this table with the address of the routines in the video BIOS (536, 538).
An example AIM exit point table appears as below:

TABLE 2

Example Exit-Point (Call-back) Table Structure

```
AIMCallBack struc
    AIMCBHeader         DB      'SADD_OUT' ; Exit-Point
                                (Callback table)
Marker
    AIMVersion          DW      ?       ; the version
                                        of the interface
    I2CAccess           DW      ?
    I2CAccessDevice     DW      ?
    GetPixelClock       DW      ?
    SetDVOPortTimings   DW      ?
    GetConfigParameters DW      ?
    TimedDelay          DW      ?
AIMCllBack ends
```

The callback table is a structure containing offset address pointers to function routines within the video BIOS or the base firmware that provide services for the add-in module. The table represents example minimal platform-hardware-specific operations that the add-in hardware may need in order to control itself (e.g. the CODEC hardware), or the parent graphics controller, for example, programming the encoder chip through a I²C interface provided within the graphics controller (I²CAccess), or getting the DVO port pixel clock rate (GetPixelClock).

When the exit point module compiled is compiled by the developer, this table is blank (denoted by the "?"). After loading the module, and while the shadow RAM is still read/write, the video BIOS may fill in the table, inserting the correct information addresses. This table, which may be located in the add-in module, is itself located relative to the start of the add-in module. Therefore, the relocation base offset may be used by code to locate the table, before the function pointer contained in the table can be called.

The add-in module may use these callbacks in the context of a call-in by the video into one of entry points. Therefore, since the parameter includes the RBO, the callback address may be calculated, for example, as follows:

```
mov    esi, ContextHandle      ; lower 16bits contains
                               the RBO
mov    di, OFFSET AIMCallBacks ; points to the start
                               of the callback table
```

(after Header & Version)
```
mov    ax, cs:[si + AIMCALLBACK_HDR + (callIndex*2)];
       calculates the pointer entry
call   ax                      ; calls the Callback to enter
                               the Video BIOS routine
```

Continuing discussion of the FIG. 5 flow (after block 538):
repeat the above steps for as many modules as necessary (504, "Y" branch of 506);
upon completion of the BIOS POST phase ("N" branch of 506);
  compute new BIOS checksum, including recent module image addendums (550);
  save the new checksum in the option ROM header (552);
  compute the new BIOS option ROM size (552);
  save the new size in the option ROM header (552);
the video BIOS then may perform the remainder of its POST initialization;
  the system BIOS will ultimately change the shadow RAM mapping to read-only (i.e., to block further writing);
the completed run-time video BIOS image is now customized and configured for the platform, including any optional display hardware.

Accordingly, to summarize, the FIG. 5 embodiment looks (operations 504, 506) for additions in firmware devices, and for each added-in device, looks (508, 510, 512) for a valid add-in module which matches the device, appends (514) the valid module to the base firmware, and saves (516) the RBO (e.g., within a base firmware table). Finally, such example embodiment uses the RBO to patch (530, 532, 534, 536) entry/exit tables of the module, and saves (538) the context handle for this module (e.g., within the base firmware table). Such operations may be built-in (i.e., programmed) to be effected by the base firmware of the system. In practice with any given system, it may be found that there are no (0), one (1) or many (N) devices, and for each device, it may be found that there are no (0), one (1) or several (M) valid modules which are then loaded and patched as described.

During post-INIT times, the modified firmware may be used, for example, as follows:
at run-time;
  the video BIOS calls the add-in module(s) entry-points;
    within the parameters of each call into the add-in module, the video BIOS may also pass the relocation base offset (RBO) and an instance count combined together to form a context handle;
    the add-in module code may use this as a base offset to any relative references;
  the object-code within the add-in module receives the relocation offset and may use it to perform the run-time linking, e.g.;
    for any call outside the add-in module, e.g., a callback to video BIOS services;
      the add-in module code may take the given RBO and use it to locate the table and thereby the function pointer entry (which are at fixed offsets within the structure) in the callback table;
    for any call to relocatable code within the add-in module;
      any code label may be compiled as a relative reference in the intermediate object code;

the RBO may be added to the relative address in a register to arrive at the absolute address;

the call may then be placed using a call-through register pointer;

for any reference to relocatable data within the add-in module;

any data label may be compiled as a relative reference in the intermediate object code;

the RBO may be added to the relative address in a register to arrive at the absolute address;

the data offset may then be de-referenced through register indirect addressing.

Figure 8:
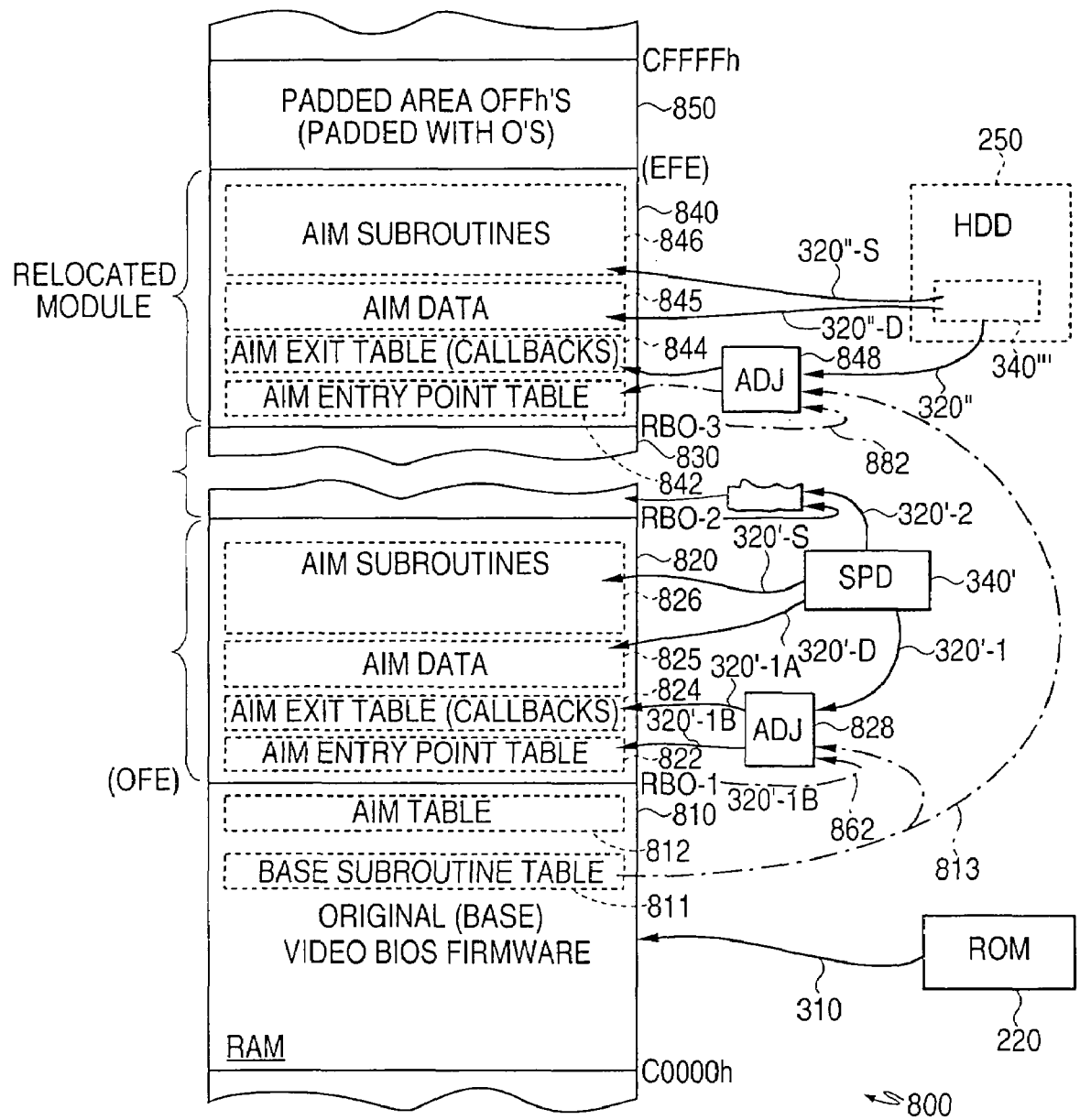
FIG. 8 is a simplistic visual representation of example firmware loading operations with example firmware extensions, such FIG being useful for a better understanding of "relocation" adjustments performed with respect to loaded firmware extensions.

As a further, visual example of extended firmware and operations related to loading thereof, attention is directed to FIG. 8. More particularly, FIG. 8 is a simplistic visual representation of an example firmware loaded with example firmware extensions, such FIG. being useful for a better understanding of "relocation" adjustments performed with respect to loaded firmware extensions. The firmware may be loaded within a RAM, but practice of the present invention is not limited thereto, e.g., embodiments are envisioned where the active shadow-copied firmware is stored to and accessed from a protected area of HDD 250 (FIG. 2).

Shown in the FIG. 8 view 800 is a simplistic view of a shadow RAM region containing example firmware sections which may be resultant from using an embodiment of the present invention. First, note that there is an original (non-extended) firmware section 810 ending at an original firmware ending (OFE) address, and also, that a later part of the shadow RAM region may contain an unused padded area 850 (which may be padded, for example, with all zeros or ones). The original (non-extended) firmware 810 may, as previously discussed, be shadow copied (shown representatively by the curved arrow 310) from the ROM 220 during the short R/W shadow RAM range previously discussed/illustrated with respect to FIG. 3. At the time the original (non-extended) firmware 810 has been shadow copied, but where no further firmware extensions (discussed ahead) have yet been shadow copied, the padded area 850 may actually abut directly against the original (non-extended) firmware 810 section at the original-firmware ending (OFE) address.

Discussion turns next to example shadow copying operations with respect to a number of example firmware extensions copied also during the short R/W shadow RAM range, so as to shadow copy further firmware extensions needed to support any added AIM (e.g., a display card). The first example concerns the shadow copying of a firmware extension for the FIG. 4 Device #1, with the copied firmware extension being show representatively as the FIG. 8 section 820. Note that each of the FIG. 8 sections 820, 830, 840 (delineated visually to the left within "{" bracketing) represent relocated (shadow copied) modules.

More particularly, the Firmware Extension—Device #1 section 820, may be shadow copied from the FIG. 4 SPD 340' during the short R/W shadow RAM range. As a non-exhaustive/non-limiting example, the Firmware Extension—Device #1 section 820 may include an AIM-Entry Point Table section 822 (e.g., the previously-discussed Table 1) and AIM-Exit Table section 824 (e.g., the previously-discussed Table 2), AIM data section 825, as well as AIM an Subroutines section 826.

Regarding the AIM entry point table section 822, a "relocation" adjustment may be made to information within the table. More particularly, the AIM entry point table stored within the original SPD 340' has pointer addressing relevant to memory addressing locations within the SPD, i.e., the pointers may be related to (e.g., offset from) a predetermined (reference) address within the SPD. When a copy of the AIM entry point table is relocated to a new memory location within an active firmware memory (e.g., shadow RAM region), the SPD addresses may no longer make sense within the differing address region of the RAM, and accordingly, the pointers may advantageously undergo "relocation adjustment" to make sure that the pointers correctly point to new relocation addresses.

As one viable example, since the Firmware Extension—Device #1 is (in the present example) being integrated after the original base firmware starting from FIG. 8's OFE address, such OFE address also may be used as a new reference relocation base offset (RBO) address (designated as RBO-1 in FIG. 8). There are numerous ways in which the RBO-1 address may be used for relocation adjustment. As one example, each AIM entry point table 822 pointer may be related to (e.g., offset from) the RBO-1 address, as opposed to being related to (e.g., offset from) the predetermined (reference) address within the SPD. As another example, if each pointer contains "X" bits of information, a first subset (upper "Y" bits) of these X bits may be used to contain the RBO-1 address, while a second subset (lower "Z" bits) may be used to contain the offset from Y-bit-designated (RBO-1) reference address.

Accordingly, as one example arrangement to effect adjustment, an (initialization-time or other R/W shadow RAM time) adjuster 828 (FIG. 8) may be provided to receive table information (shown representatively by the curved arrows 320'-1, 320'-1A) from the SPD 340' as well as the RBO information (designated generically by the FIG. 8 representative long-/short-dashed arrow 862), and dynamically adjust, during an initialization time (or other viable R/W shadow RAM time) of the system, addressing pointers of the AIM entry point table 822. Such adjuster 828 may be provided as part of a larger shadow-copying arrangement.

Turning discussion next to the FIG. 8 AIM exit table 824, "relocation" adjustment also may be made to information within such table. More particularly, the AIM exit table stored within the original SPD 340' may have pointers with blank addressing information (see Table 2). For example, one or more pointers may concern a callback to a subroutine know to exist within base firmware (or a previously-copied firmware extension), but the exact return address may be unavailable/unknown until the base firmware (or firmware extension) is actually shadow-copied (e.g., from the ROM 220) into the shadow RAM region.

To accommodate address fill-in, as a general shadow copying of base firmware and any firmware extensions progresses, a base subroutine table 811 (e.g., containing addressing information for base firmware subroutines) may be compiled and stored (e.g., at a known location within the shadow-copied base firmware image). In addition, an AIM table 812 (e.g., containing addressing (e.g., RBO), data and/or other information regarding any relocated modules) may be compiled and stored (e.g., at a known location within the shadow-copied base firmware image).

Continuing discussion, the base subroutine table 811 may be accessible (show representatively by the long/double-short dashed arrow 813) by the adjuster 828 (and 848). Alternatively, the shadow copying arrangement (including any relocation adjusters) may keep a listing of the actual firmware memory (shadow RAM) addresses of various subroutines encountered. When a copy of the AIM entry point table is relocated to a new memory location within the active firmware memory (e.g., shadow RAM region), the exit pointers may advantageously undergo "relocation adjustment" (show representatively by the arrow 320'-1A). That is, each exit callback pointer may be filled in with the appropriate address of a desired subroutine located (already shadow copied) within the active firmware memory (e.g., shadow RAM region).

The AIM data section 825 as well as AIM subroutines section 826 may represent purely relocatable code, in that such code may be able to be copied in toto without any adjustment or change (shown representatively by the FIG. 8 arrows 320'-D and 320'-S).

Further, as an alternative, one or both of the AIM entry point table section 822 and AIM exit table section 824 may also be able to be provided as purely relocatable code, to be copied in toto without any adjustment or change, with proper operation instead relying on dynamic adjustment at times when table entries are accessed/used. For example, a context handle instruction data (CHID; discussed in greater detail ahead) may include the RBO address of the module, which RBO may then be used to dynamically adjust any entry pointer retrieved from the AIM entry point table. Further, the CHID may itself contain an accurate listing (e.g., table) of addresses of potential callback subroutines for dynamic cross-referencing to the AIM exit table.

In continuing the FIG. 8 layout discussions, a second relocated module 830 (e.g., pertaining to the FIG. 4—Device #2 420) may be likewise integrated (shown representatively by the arrow 320'-2) from the SPD 340' beginning at the address RBO-2. Discussions concerning integrating the second relocated module are analogous to that of the first module (except that the second RBO-2 address is used instead of the first RBO-1 address). Accordingly, redundant discussion thereof is omitted for the sake of brevity.

A third module 840 may be likewise integrated beginning at an address RBO-3 so as to support yet another hardware device (e.g., network card; not shown) added to an original platform. Discussions concerning integrating such module are substantially analogous to that of the first module 820, with discussions of the items 842, 844, 845, 846, 848, 882 and 320" being analogous to items 822, 824, 826, 828, 862 and 320'-1 (except that the third RBO-3 address is used (shown representatively by the long/short dashed arrow 882) instead of the first RBO-1 address). As a further difference, the original module image is copied (show representatively by the arrows 320" 320"-D, 320"-S) from the aforementioned custom F/S 340''' device (provided as a protected (e.g., locked, read-only) area of any non-volatile (NV) memory, such as HDD 250).

In this instance, when the OEM added the additional hardware device (not shown) to the original platform, the OEM may have provided the third module image onto the HDD 250, for example, in a manner/format like that discussed previously with respect to FIG. 11. According, the OEM (and an ultimate user) can take advantage of an already-existing non-volatile device, rather that incurring the further cost/time/manufacturing expense of adding another SPD. As mentioned previously, the shadow-copying arrangement may find the Firmware Extension—Device #3 image within the HDD (or even on an external network) via polling during the initialization processes. All other redundant discussion concerning the third module 840 (and associated operations) is omitted for the sake of brevity.

Continuing discussion, the third relocated module 840 is illustrated as ending at an example extension firmware ending (EFE) address. With the present example, while the padded area had originally started at the FIG. OFE address, the padded area now starts at the EFE address. Accordingly, one advantage of the present invention is that it can make dynamic use of any previously unused padded area 850 (without requiring the provision of separate firmware memory), to dynamically load helpful firmware extensions onto the base firmware.

Figure 9:
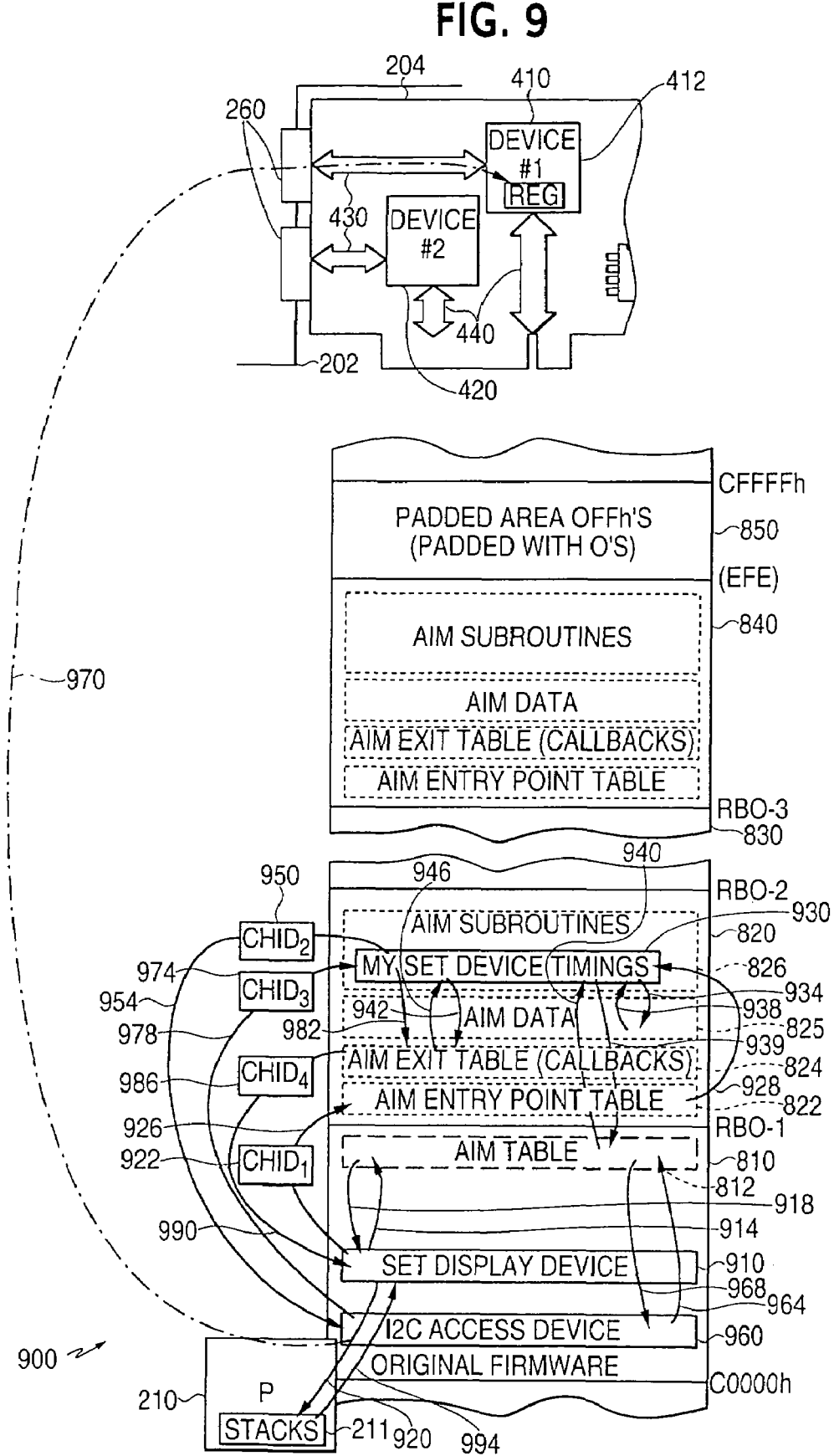
FIG. 9 is a simplistic visual representation of example run-time linking operations with respect to an example device timing setting operation, such FIG. being useful for a better understanding of an example run-time linking performed with respect to loaded firmware extensions.

Once all firmware extensions have been loaded into the shadow RAM, such device is then set to read-only to prevent further writing. The extended firmware image may then be used to effect/control the boot and other operations. FIG. 9 is a simplistic visual representation 900 of example run-time linking operations, using the setting of parameters within the register 412 as an example. Such FIG. is useful for a better understanding of example run-time linking performed with respect to loaded firmware extensions.

More particularly, upon boot (or other legal R/W shadow RAM write time, as discussed ahead), for example, the processor 210 (FIG. 9) begins to implement the system (shadow-copied) firmware code. At some point in implementation, the processor 210 may encounter code having the function to set timing parameters useable in a display output section (e.g., register 412 of Device #1 on the card 204), i.e., the processor 210 may encounter SetDisplayDevice 910 code. Responsive to execution of a portion of such code 910, there may be an accessing 914 of the AIM table 812 to obtain 918 information (e.g., an RBO) pertaining to any relevant AIM extension module, such as the first module 820.

Further code 910 may then use the obtained information 918 in further processing to prepare for a jump (branch) to processing of code for the module 820. Prior to a jump, relevant addressing, register data, etc. pertaining to present code processing may be pushed 920 onto stacks 211 associated with the processor 210 so as to facilitate later return/continuation of such code processing. Further, context handle instruction data (CHID) may be prepared.

The CHID may contain, for example, "context handle" information which may, for example, include a pointer which may allow any AIM extension module to access AIM table information pertaining to itself from the AIM table 812. The CHID may further contain any other data or information useful for execution of the AIM extension module code or function.

For example, in the present code example directed to set timing parameters useable in a display output section (e.g., Device #1 of the card 204), the CHID may contain data defining a timing which the display output section should effect (e.g., a scanning speed of a display). The CHID may also contain the RBO base address of the extension module. The CHID may be compiled/saved in any predetermined manner/format, for example, set into appropriate registers or caches associated with the processor, or stored in a known system memory location. In the present example, assume that a jump (branch) is to be made to the SetDeviceTimings subroutine of the first AIM extension module 820

A thus-formed CHID$_1$ 922 information is carried forward (maintained) with the jump 926 to the module 820, and the AIM entry point table 822 (see Table 1 also) is used to jump 928 to the relevant MySetDeviceTimings code 930. Processing of such code 930 may cause an accessing 934 of AIM data section 825 to obtain 938 AIM data (e.g., Device #1 register 412 settings required to achieve the instructed timing), and/or an accessing 939 (using the context handle pointer) of the AIM table 812 to obtain 940 AIM table data pertaining to the module (e.g., a system address for the register 412). Still further, there may be an accessing 942 of the AIM exit table 824 (see Table 2 also) to obtain 946 a callback address of a subroutine (I2CAccessDevice in the present example) necessary to help set the device timing.

Based upon such information, the subroutine code 930 prepares new CHID$_2$ 950 information and effects a jump (branch) 954 back to the I2CAccessDevice subroutine code 960 within original (base) firmware 810. The CHID$_2$ 950 may contain, for example, the context handle, the RBO, values which should be set into the register 412, and an address useable to return back to a proper continuation point within the MySetDeviceTimings subroutine 930, once the I2CAccessDevice subroutine code 960 has completed the request. Processing of the code 960 may cause an accessing 964 (e.g., using the context handle pointer) of the AIM table 812 to obtain 968 AIM table information pertaining to the request (e.g., a system address for the register 412; an identifier of the Device 410).

Processing of the code 960 then effects storage 970 of appropriate settings within the register 412, so as to set the timing parameters of the display output section (e.g., device #1 of the card 204). Upon completion and/or verification of the setting, the code 960 may prepare another CHID$_3$ 974 and effect a jump (branch) 978 back to the MySetDeviceTimings subroutine 930 of the extension module 820. The CHID$_3$ 974 may contain, for example, the context handle, the RBO, verification that device setting was successful, etc.

The subroutine 930 may then effect accessing 982 of the AIM exit table 824 to obtain an exiting callback address (or alternatively, use of a return address contained within the original CHID$_1$) and prepare a CHID$_4$ 986 for a return (branch) 990 back to the original requesting SetDisplayDevice subroutine code 910. The CHID$_4$, may contain, for example, the context handle, the RBO, verification that device setting was successful, etc.

Continued processing of the code 910 may cause restoration 994 of information, etc., from the stacks 211. The code 910 may use information from the CHID$_4$, to determine subsequent action. For example, if the CHID$_4$, contained verification of an unsuccessful setting of device timing, an error indication (e.g., predetermined sequence of tones) may be outputted from the system (assuming that there is sound support). Alternatively, if the CHID$_4$, contained verification of a successful setting of device timing, processing of further firmware code may be continued.

Discussion turns next to driver support. Regarding driver module enumeration, the O/S native drivers may also be enhanced with modules stored in non-volatile storage such as flash devices, HDD devices, over the network devices on the platform, or in an add-in adapter. As mentioned previously, example embodiments of the invention allow downloading these driver modules from the add-in adapter at run-time (for example using I$^2$C to extract the modules from the SPD) and installing them in the native driver stack through O/S methods.

Figure 6:
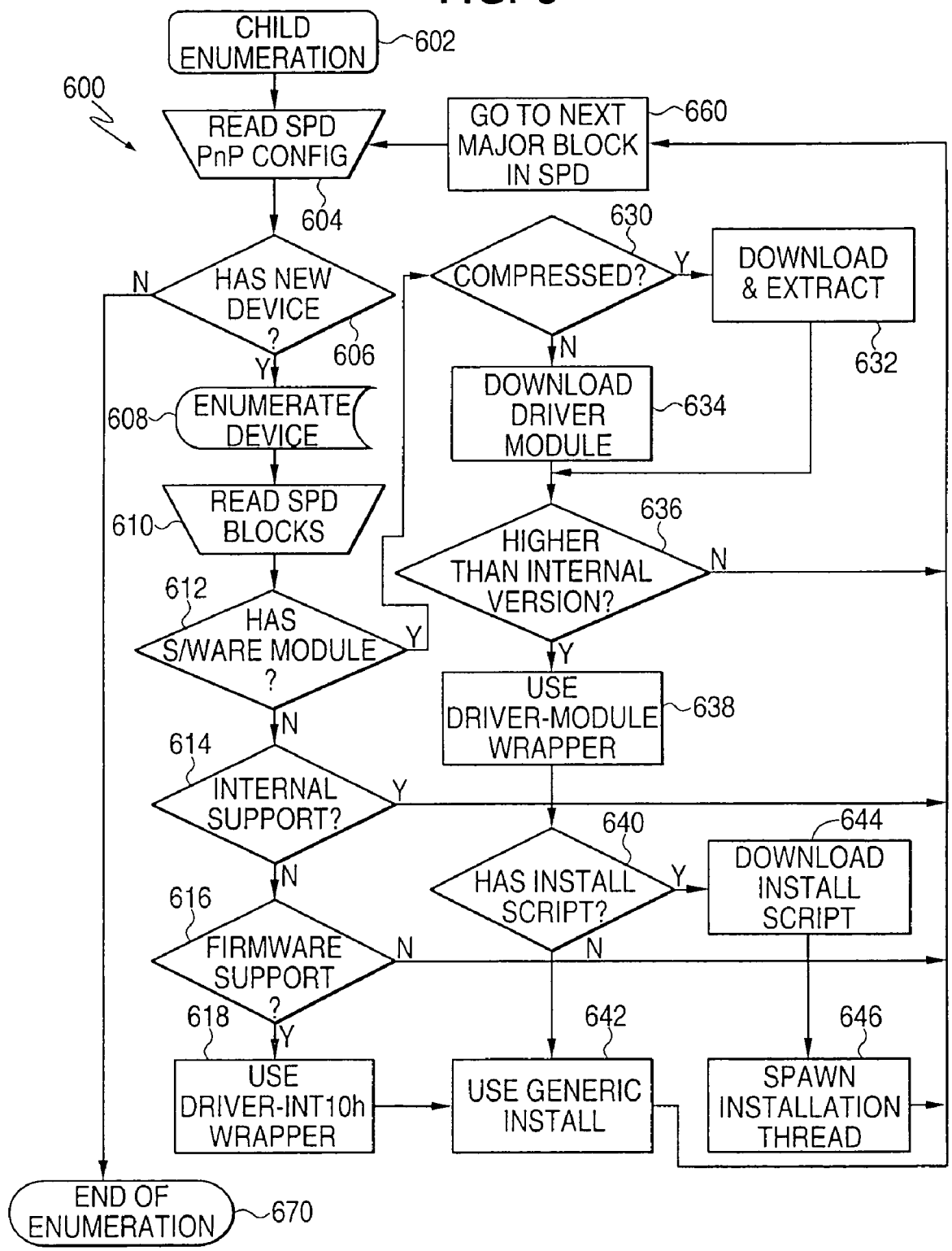
FIG. 6 is an example flow chart of an example driver run-time loading process applicable to the FIGS. 1-4 arrangements, such chart being helpful in gaining a more thorough understanding/appreciation of the present invention.

An example algorithm for enumerating and loading driver support may be as illustrated in FIG. 6. More particularly, FIG. 6 is an example flow 600 of an example driver run-time loading process applicable to the FIGS. 1-4 arrangements, such chart being helpful in gaining a more thorough understanding/appreciation of the present invention. Such FIG. 6 example flow chart may be described as follows.

Figure 7:
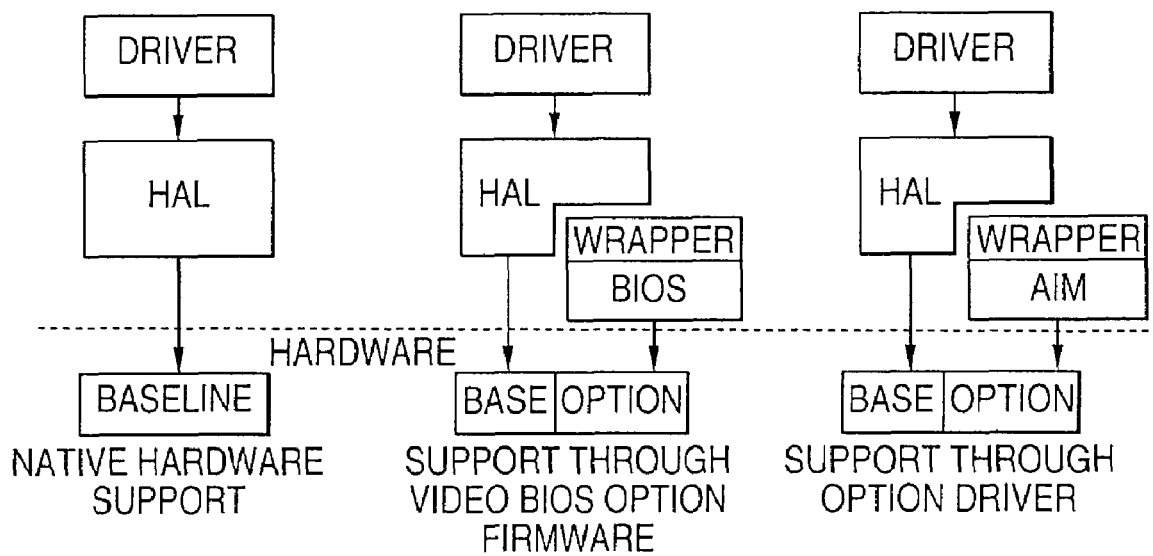
FIG. 7 is an example block diagram view of an example firmware/driver option-hardware abstraction layer, such view being helpful in gaining a more thorough understanding/appreciation of the present invention.

Reading PnP Config Information:
- if there is an added child (e.g., daughter-card) device (FIG. 6, 602), then enumerate indexed child;
- if the child hardware has an SPD, then read it (604) for the plug-and-play (PnP) configuration;
- for each new device ("Y" branch of 606) of the child hardware (e.g., new device 410 of the card 204), enumerate (608) the device and read (610) any non-volatile storage blocks pertaining to the driver; that is: looking for driver modules, and installation scripts and other O/S driver relevant add-in components; there may be already existing internal support, e.g., in the original firmware of the platform;
- in the event that add-in driver support is provided in the non-volatile storage, a decision (612) must be made as to whether native driver support supercedes the add-in module support;
  - if ("Y" branch of 612) there is a driver add-in module (AIM), a compression query (630) may be made, and the add-in driver module downloaded in a proper way (632 or 634), and then there may be a comparison (636) of the downloaded module's version number to any internal support's version number;
    - if the driver AIM's version is higher ("Y" branch of 636) than the internal driver's version, then use the external loadable add-in driver module support (638); if lower or equal ("N" branch of 636), use the internal support
  - If the internal support is used this may be through a FIG. 7 arrangement 700 native driver support (as in FIG. 7. 701), an add-in driver module already installed (as in FIG. 7. 708), or through wrapper to the add-in module firmware support that was appended to the video BIOS (FIG. 7. 705) as described in the section on FIG. 5. (501-556);
  - assuming external support is used a check is made for installation script (640), and if present ("Y" branch of 640), then download any install script (644) and spawn the installation program (646); if not present ("N" branch of 640), use a generic install (642);
  - the installation program may use the signature algorithm and secret value or key, as previously described in FIG. 5 (510-512) to verify the "signature value" of the add-in software module stored in non-volatile storage with the add-in software module, against the run-time value computed over the loaded add-in software module image;
  - the installation program may refuse to install the add-in driver module if the origin and integrity cannot be confirmed;
- if in block 612 there is no driver add-in module provided by the child hardware, check for platform internal support (614) and firmware support (BIOS) (616);
  - the video BIOS firmware may have support, as it is the minimal requirement in order to have a working display so that the POST messages are visible when booting the system;
  - if firmware supported ("N" branch of 514 and "Y" branch of 616), then use the "Driver to Int10h" wrapper (618 and FIG. 7. 704, 705), and use a generic install (642);
    - add-in device operations will be abstracted through Int10h interface provided by the video BIOS (FIG. 7. 705);
- ones of the previously-described blocks eventually feed back to block 660, where a process goes to a next major block in SPD; once it is determined (via information) in blocks 604, 606 that repeat of the previously-described flows is not warranted ("N" branch of 606), flow goes to an end of enumeration (670).

As a result of the foregoing discussions and example flow, it should be apparent that through suitable mechanisms and programming, there can advantageously be accomplished the initialization-time and run-time integration of firmware and software extensions for supporting add-in hardware. For example, in one described example embodiment, the invention depends on a means by which add-in display cards can be identified, and introduces a new method for loading and integrating the necessary firmware and software to support the card at initialization-time (or any legal R/W shadow RAM write time) and run-time from the card, ensuring that any card may be instantly supported from the first time the card is installed in the platform. In another example embodiment, the invention introduces a means by which the physical presence of display options (daughter-cards) can be identified, and only the firmware and software necessary to support the card can be downloaded on demand. By loading only the firmware support needed on demand, the invention reduces the final video BIOS image size.

Discussion turns next to illustration of an example hardware abstraction layer. More particularly, FIG. 7 includes example block diagram views of an example firmware/driver option-hardware abstraction layer arrangements, such views being helpful in gaining a more thorough understanding and appreciation of the present invention. Further detailing, a Hardware Abstraction Layer (HAL) (702) is employed in the driver stack to accommodate the type of level of support that is introduced to support the add-in hardware option. This allows the drivers (701) to remain unchanged as new firmware and software drivers are introduced into the system (705, 706, 708) in support of the new hardware. Viewing FIG. 7, a left-hand illustration in FIG. 7 illustrates a HAL (701) in a native hardware support, a middle illustration illustrates a HAL via support through video BIOS option firmware (705), and finally, a right-hand illustration illustrates an example HAL via support through an option AIM driver (708). In both cases the wrapper around the support makes the specific implementation match the HAL interfaces allowing the integration under the hardware abstraction layer using the same driver.

In beginning to conclude, it should be apparent that embodiments of the present invention may be integrated into many arrangements to provide add-in hardware support, e.g., integrated graphics hardware solutions. As one primary example, it may be used to enable platforms supporting an ADD card feature, or the addition of any hardware needing additional support. For example, it may be applied to any graphics platform where the choice of display encoders is optional, or where there is no foreknowledge of all the possible configuration of display options. Thus, this invention allows the integrated graphics platform, for example, to have fully configurable display options, and does not force the platform or chipset provider to fix on one or more display options in advance. It removes the burden of, for example, supporting numerous possible display options from the IC chip software development teams, and leaves more freedom to the developer of display technologies to innovate and enhance the graphics platform.

Figure 3:
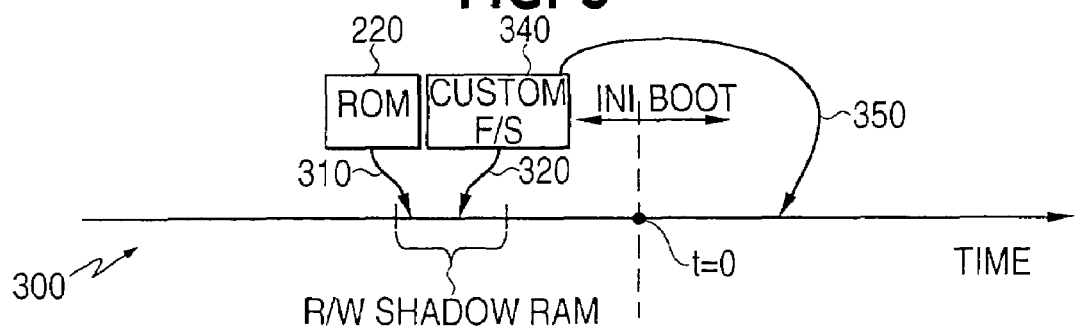
FIG. 3 is a combination time chart and block diagram view helpful in gaining a more thorough understanding/appreciation of background as well as the present invention.

Throughout portions of the previous disclosure, it was alluded to that practice of the firmware augmenting of the present invention may not be limited to the INIT times (i.e., may not be limited to the R/W Shadow RAM write time during INIT (see left portion of FIG. 3). A right portion of FIG. 3 will now be used to more explicitly describe the same.

More particularly, contemporary systems may include Power Management (PM) functions/operations, which may help the system to conserve energy and/or extend battery life. One of these functions, for example, may be a hibernate (sleep) function/operation to power down a majority of the system, and a corresponding resume (wake) function/operation to return the system back to its pre-sleep state. Such hibernate state may be manually entered upon command by a user, or self-entered by the system (for example, upon the system tracking and sensing that it has been idle (unused by a user) for a predetermined period of time (e.g., 10 minutes)).

A right side portion of FIG. 3 illustrates an arbitrary Power Management (PM) time, when, for example, a hibernate function operation is triggered. Responsive thereto, copies of important volatile system resources such as the then existing firmware image, register values/settings, cache values/settings, etc., may be copied at some predetermined non-volatile (NV) memory 250 area, as shown representatively by FIG. 3's headed arrow 360. Thereafter, a majority of the system is powered down. Some time later, the system senses a user command (e.g., key depression) commanding the system to resume. Responsive thereto, sleeping portions of the system are powered back up and upon reaching a stable (e.g., non-volatile) state, copied system resources from the NV memory 250 area are written back (shown representatively by FIG. 3's headed arrow 370) to their respective memory locations, registers, etc.

As part of such restoration, the pre-hibernate firmware image may be written back into the R/W Shadow RAM during a temporary PM R/W Shadow RAM Wr (write) time (shown representatively in the right side portion of FIG. 3). Thereafter, the R/W Shadow RAM is locked back to a read-only state, and some time thereafter, the system achieves a resume (RS) state as shown in FIG. 3. Thereafter, the system can function as it had been before entering the hibernate state.

The above described PM hibernate/resume represents but one non-limiting example of where practice of the firmware augmenting/image-forming feature of the present invention may be further practiced, beyond the previously described INIT times. More particularly, as one example, rather than saving a copy of the R/W Shadow RAM's firmware image upon triggering of PM hibernate operations, the firmware image can instead simply be allowed to be "lost" when the RAM is powered down to hibernate, and then re-formed/-augmented in response to sensing a resume command, i.e., re-formed/-augmented in the same manner as was described previously with respect to the INIT times. Such is shown representatively by the dashed line enclosure and headed dashed line 380 within FIG. 3. Stated generally, the firmware augmenting/image forming feature/operations may be able to be performed during any legal R/W Shadow RAM initialization write period defined (i.e., validly allowed) within the system in which it is implemented, the INIT R/W Shadow RAM initialization write time, and the PM R/W Shadow RAM initialization write time simply being non-limiting examples of such legal initialization write times. That is, the firmware augmenting/image forming feature/operations may occur any time following system components (e.g., the R/W Shadow RAM) being powered completely up, and during any temporary R/W Shadow Ram initialization write time.

Further, by "operative," it is meant that a claimed item (e.g., device, system, etc.) has the proper hardware, hardwiring and/or programming capable to accomplish the features/limitations of the claimed invention, but does not necessarily mean that an item has to be operating to infringe.

In synopsis, this invention leverages off the normal initialization (or any legal R/W shadow RAM write time) process, specifically via a function where a shadow RAM region is written during the video BIOS POST phase to add in firmware support. During this interval, as many support items, e.g., display encoder modules, as required, are copied into firmware ROM shadow region and the firmware size is appended. This allows the firmware (e.g., BIOS) to be changed dynamically during an INIT (or any legal R/W shadow RAM write time) process, and to grow or shrink as much as necessary to incorporate the necessary device support. Thus, this invention allows the direct integration of object code, bypassing at least some normal linking steps, and most certainly, eliminates manual (non-initialization process/time) linking steps. The development of platform options (e.g., display options) is no longer directly connected to the development of the platform's firmware or software driver stack. The BIOS does not need to provide images, or linking tools, to the developer of option modules. Additionally, the developer can ship the object code produced by the source compiler and it can be integrated on any version of the platform with any BIOS image that supports this method. Further, this invention allows the instantaneous support for unknown or unforeseen future hardware without impacting the platform, or requiring manual updating of the platform's software and firmware components.

In concluding, reference in the specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

Further, at least a major portion of the present invention may be practiced as a software invention, implemented in the form of a machine-readable medium having stored thereon at least one sequence of instructions that, when executed, causes a machine to effect the invention. With respect to the term "machine", such term should be construed broadly as encompassing all types of machines, e.g., a non-exhaustive listing including: computing machines, non-computing machines, communication machines, etc. Similarly, which respect to the term "machine-readable medium", such term should be construed as encompassing a broad spectrum of mediums, e.g., a non-exhaustive listing including: magnetic medium (floppy disks, hard disks, magnetic tape, etc.), optical medium (CD-ROMs, DVD-ROMs, etc), etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A system comprising:
    at least one of a memory and a power supply;
    an initialization-time integrator to dynamically integrate at least one firmware extension onto base firmware in real-time during an initialization-time of the system, at least one of the at least one firmware extension is firmware to support hardware added to an original platform of the system, the dynamic integration to perform a relocation adjustment to adjust addressing pointers of an entry point table and an exit table of the firmware extension, wherein the initialization-time integrator includes an adjuster to receive table information from a customization storage and a relocation base address corresponding to an original firmware ending address of the base firmware; and
    a verifier operative to verify for each firmware extension of the at least one firmware extension, at least one of an origin and integrity of the firmware extension, and, in an event where the verification fails, to inhibit at least one of integration and execution of the firmware extension;
    wherein the verifier is operative to generate a real-time cryptographic-generated signature of an image of the firmware extension and to compare the real-time cryptographic-generated signature with a stored cryptographic-generated signature associated with the firmware extension to verify the firmware extension.

2. A system as claimed in claim 1, wherein the at least one firmware extension is integrated with the base firmware via shadow-copying thereof together into a shadow-RAM (random access memory) during a shadow-RAM read/write initialization-time phase of the system.

3. A system as claimed in claim 2, wherein the shadow-RAM read/write initialization-time phase is one of: an INIT read/write initialization-time phase; and a power management (PM) read/write initialization-time phase.

4. A system as claimed in claim 1, wherein the at least one firmware extension is provided from at least one of: a daughter-card, memory hardware and hard disk drive (HDD) data of the system, and a network external to the original platform in which the initialization-time integrator is installed.

5. A system as claimed in claim 1, comprising a run-time integrator to dynamically integrate at least one driver in real-time during a run-time of the system, the at least one driver to support the hardware added to the original platform of the system.

6. A system as claimed in claim 5, wherein the at least one driver is obtained from at least one of: a daughter-card, memory hardware, hard disk drive (HDD) data of the system, and a network external to the original platform in which the initialization-time integrator is installed.

7. A system as claimed in claim 1, wherein the initialization-time integrator is operative to perform polling during initialization of the system, to determine at least one of: an existence, a location, a name, a type and a size of any firmware extension for integration with the base firmware during the initialization-time of the system.

8. A method comprising:
    dynamically integrating at least one firmware extension onto base firmware in real-time during an initialization-time of a system, the at least one firmware extension stored in a first storage of the system separate from a second storage that stores the base firmware, the dynamic integration to perform a relocation adjustment to adjust addressing pointers of an entry point table and an exit table of the firmware extension; and
    verifying for each firmware extension of the at least one firmware extension, at least one of an origin and integrity of the firmware extension by generating a real-time cryptographic-generated signature of an image of the firmware extension and comparing the real-time cryptographic-generated signature with a stored cryptographic-generated signature associated with the firmware extension; and in an event where the verification fails, inhibiting at least one of integration and execution of the firmware extension.

9. A method as claimed in claim 8, wherein the at least one firmware extension is integrated with the base firmware via shadow-copying thereof together into a shadow-RAM (random access memory) during a shadow-RAM read/write initialization-time phase of the system.

10. A method as claimed in claim 9, wherein the shadow-RAM read/write initialization-time phase is one of: an INIT read/write initialization-time phase; and a power management (PM) read/write initialization-time phase.

11. A method as claimed in claim 8, wherein at least one of the at least one firmware extension is firmware to support hardware added to an original platform of the system.

12. A method as claimed in claim 11, wherein the at least one firmware extension is provided from at least one of: a daughter-card, memory hardware hard disk drive (HDD) data, and a network external to the original platform in which the method is implemented.

13. A method as claimed in claim 11, comprising dynamically integrating at least one driver in real-time during a run-time of the system, the at least one driver to support the hardware added to the original platform of the system.

14. A method as claimed in claim 13, wherein the at least one driver is obtained from at least one of: a daughter-card, memory hardware hard disk drive (HDD) data, and a network external to the original platform in which the method is implemented.

15. A method as claimed in claim 11, comprising polling during initialization of the system, to determine at least one of: an existence, a location, a name, a type and a size of any firmware extension for integration with the base firmware during the initialization-time of the system.

16. A machine-readable medium having stored thereon at least one sequence of instructions that, when executed, causes a machine to:

dynamically integrate at least one firmware extension onto base firmware in real-time during an initialization-time of a system, the at least one firmware extension stored in a first storage of the system separate from a second storage that stores the base firmware, the dynamic integration to perform a relocation adjustment to adjust addressing pointers of an entry point table and an exit table of the firmware extension;

verify for each firmware extension of the at least one firmware extension, at least one of an origin and integrity of the firmware extension by generating a real-time cryptographic-generated signature of an image of the firmware extension and comparing the real-time cryptographic-generated signature with a stored cryptographic-generated signature associated with the firmware extension; and in an event where the verification fails, to inhibit at least one of integration and execution of the firmware extension.

17. A machine-readable medium as claimed in claim 16, wherein the at least one firmware extension is integrated with the base firmware via shadow-copying thereof together into a shadow-RAM (random access memory) during a shadow-RAM read/write initialization-time phase of the system.

18. A machine-readable medium as claimed in claim 17, wherein the shadow-RAM read/write initialization-time phase is one of: an INIT read/write initialization-time phase; and a power management (PM) read/write initialization-time phase.

19. A machine-readable medium as claimed in claim 16, wherein at least one of the at least one firmware extension is firmware to support hardware added to an original platform of the system.

20. A machine-readable medium as claimed in claim 19, wherein the at least one firmware extension is provided from at least one of: a daughter-card, memory hardware, hard disk drive (HDD) data, and a network external to the original platform of the system.

21. A machine-readable medium as claimed in claim 19, where the at least one sequence of instructions causes the machine to dynamically integrate at least one driver in real-time during a run-time of the system, the at least one driver to support the hardware added to the original platform of the system.

22. A machine-readable medium as claimed in claim 21, wherein the at least one driver is obtained from at least one of: a daughter-card, add-in card, memory hardware, hard disk drive (HDD) data, and a network external to the original platform of the system.

23. A machine-readable medium as claimed in claim 19, where the at least one sequence of instructions causes the machine to poll during initialization of the system, to determine at least one of: an existence, a location, a name, a type and a size of any firmware extension for integration with the base firmware during the initialization-time of the system.

* * * * *